United States Patent
Sato (10) Patent No.: US 11,066,138 B2
(45) Date of Patent: Jul. 20, 2021

(54) FLOATING STRUCTURE INSTALLATION SYSTEM AND FLOATING STRUCTURE INSTALLATION METHOD

(71) Applicant: MITSUBISHI HEAVY INDUSTRIES, LTD., Tokyo (JP)

(72) Inventor: Kei Sato, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 16/787,283

(22) Filed: Feb. 11, 2020

(65) Prior Publication Data
US 2021/0031886 A1 Feb. 4, 2021

(30) Foreign Application Priority Data
Aug. 1, 2019 (JP) .............................. JP2019-141975

(51) Int. Cl.
*B63B 13/00* (2006.01)
*B63B 77/10* (2020.01)
*F03D 13/25* (2016.01)

(52) U.S. Cl.
CPC .............. *B63B 77/10* (2020.01); *B63B 13/00* (2013.01); *F03D 13/25* (2016.05)

(58) Field of Classification Search
CPC .......... B63B 77/10; B63B 13/00; F03D 13/25
See application file for complete search history.

(56) References Cited

U.S. PATENT DOCUMENTS

| 9,738,354 | B2* | 8/2017 | Van Grieken | B63B 35/003 |
| 10,233,909 | B2* | 3/2019 | Ehrnberg | F03D 9/25 |
| 10,377,450 | B2* | 8/2019 | Nakamura | B63B 21/20 |
| 2012/0025552 | A1* | 2/2012 | Echarri Latasa | B66C 1/62 |
| | | | | 294/67.31 |
| 2012/0183359 | A1* | 7/2012 | Nordstrom | B63B 35/003 |
| | | | | 405/205 |

(Continued)

FOREIGN PATENT DOCUMENTS

| CN | 103167983 | 6/2013 |
| EP | 2436593 | 4/2012 |

(Continued)

OTHER PUBLICATIONS

Extended Search Report dated Sep. 15, 2020 in corresponding European Patent Application No. 20156972.0.

(Continued)

*Primary Examiner* — S. Joseph Morano
*Assistant Examiner* — Jovon E Hayes
(74) *Attorney, Agent, or Firm* — Wenderoth, Lind & Ponack, L.L.P.

(57) ABSTRACT

A floating structure installation system includes, on a body capable of traveling on water, a first cradle including a first holding part capable of holding a first portion having a submersible section to be located under the water surface during installation, and a second cradle including a second holding part capable of holding a second portion connectable to the first portion. At least one of the first cradle or the second cradle is movable on the body to connect the first portion held by the first holding part and the second portion held by the second holding part. The first holding part includes a first lifting unit for lifting and lowering the first portion.

13 Claims, 9 Drawing Sheets

(56) References Cited

U.S. PATENT DOCUMENTS

| | | | | |
|---|---|---|---|---|
| 2012/0255478 A1* | 10/2012 | Hadeler | ............... | F03D 13/22 |
| | | | | 114/61.31 |
| 2013/0152840 A1* | 6/2013 | Awashima | ............ | F03D 13/25 |
| | | | | 114/125 |
| 2014/0186183 A1* | 7/2014 | Mogensen | ............ | F03D 15/00 |
| | | | | 416/170 R |
| 2017/0197690 A1* | 7/2017 | Nakamura | ............ | B63B 35/00 |
| 2019/0299343 A1* | 10/2019 | Schuring | ............... | F03D 13/10 |

FOREIGN PATENT DOCUMENTS

| | | | | |
|---|---|---|---|---|
| EP | 2597027 | | 5/2013 | |
| EP | 3147200 | | 3/2017 | |
| EP | 3170730 | | 5/2017 | |
| KR | 102015006761 | | 1/2015 | |
| WO | 2012/011601 | | 1/2012 | |
| WO | WO-2012011601 A1 * | 1/2012 | ............ | F03D 80/50 |

OTHER PUBLICATIONS

The Office Action dated Apr. 28, 2021, issued in counterpart TW application No. 109103332.

* cited by examiner

FLOATING STRUCTURE INSTALLATION SYSTEM AND FLOATING STRUCTURE INSTALLATION METHOD

BACKGROUND OF THE INVENTION

1. Technical Field

This disclosure relates to a floating structure installation system and a floating structure installation method for installing a floating structure.

2. Description of the Related Art

In a wide offshore area, large floating structures can be installed. The floating structure is, for example, a spar-type floating structure such as an offshore wind turbine for generating renewable energy. The spar-type floating structure includes a long submersible section to be located under the water surface during offshore installation, and a structure including a machine, such as a wind turbine body, may be disposed thereon.

Offshore installation work of such a floating structure has some difficulties due to its long shape, including water depth restrictions at the port during transport or installation, or necessity to prevent oscillation to ensure stability during loading or installation, thus being costly.

Techniques for reducing the cost on the floating structure installation are disclosed in WO2012/011601A, for example. WO2012/011601A discloses an installation method using a working ship for a floating structure, in which a wind turbine power generating apparatus is constructed on a ballast section including a submersible section located under the water surface during offshore installation. In WO2012/011601A, particularly, the wind turbine power generating apparatus is constructed on the ballast section while engaging a flange section disposed above the ballast section with a gripping section vertically movably disposed on the working ship to secure the flange section to the working ship, in order to improve the assembly working efficiency.

SUMMARY OF THE INVENTION

In WO2012/011601A, since the flange section disposed above the ballast section is gripped by the gripping section of the working ship, most of the ballast section is located under the water surface. Accordingly, transport or installation work is difficult in an area with strict water depth restrictions. To solve this problem, it is conceivable to lift the gripping section which grips the flange section. However, in this case, the center of gravity is lifted, so that some motion like roll, pitch, or oscillation may easily occur, for example, in rough weather. This may cause an increase in cost due to postponement or review of the work schedule.

The present disclosure was made in view of the above problems, and an object thereof is to provide a floating structure installation system and a floating structure installation method whereby it is possible to install large floating structures at low cost while meeting wide water depth restrictions and other installing conditions like waves and wind.

To accomplish the above object, a floating structure installation system according to the present disclosure for installing a floating structure including a first portion having a submersible section to be located under a water surface during installation and a second portion connectable to the first portion comprises: a body capable of traveling on water; a first cradle including a first holding part capable of holding the first portion on the body; a second cradle including a second holding part capable of holding the second portion on the body; and a moving device configured to move at least one of the first cradle or the second cradle on the body to connect the first portion held by the first holding part and the second portion held by the second holding part. The first holding part includes a first lifting unit for lifting and lowering the first portion.

To accomplish the above object, a floating structure installation method according to the present disclosure for installing a floating structure including a first portion having a submersible section to be located under a water surface during installation and a second portion connectable to the first portion comprises: a loading step of loading the first portion and the second portion on a first cradle and a second cradle, respectively, on a body capable of traveling on water; a moving step of moving the body to a destination while the first portion and the second portion are loaded on the first cradle and the second cradle respectively; a connecting step of, at the destination, connecting the first portion and the second portion by moving at least one of the first cradle or the second cradle on the body to complete the floating structure; and a detaching step of detaching the floating structure from the body.

With the floating structure installation system and the floating structure installation method according to the present disclosure, it is possible to install a large floating structure at low cost while meeting wide water depth restrictions and other installing conditions such as waves and wind.

DETAILED DESCRIPTION OF THE INVENTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

(Configuration of Floating Structure Installation System)

Figure 1:
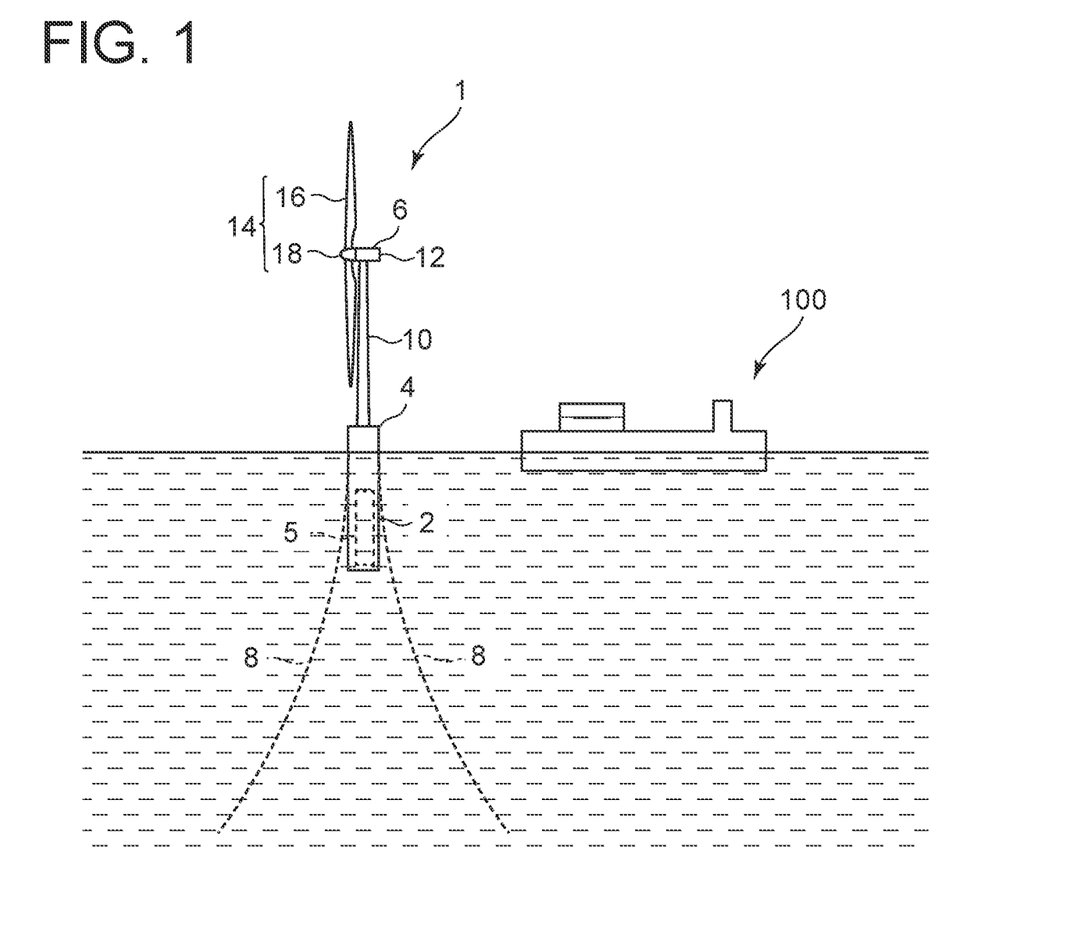
FIG. 1 is an overall configuration diagram of a floating structure installation system according to at least one embodiment of the present invention and a floating structure in side view.

FIG. 1 is an overall configuration diagram of a floating structure installation system 100 according to at least one embodiment of the present invention and a floating structure 1 in side view. The floating structure 1 is an object to be installed by the floating structure installation system 100 and is capable of floating on water. In the following embodiments, a floating offshore wind turbine of spar type that can be installed at sea will be described as an example of the floating structure 1, but the floating structure is not limited thereto.

The floating structure 1 includes a first portion 4 having a submersible section 2 to be located under the water surface during installation and a second portion 6 connectable to the first portion 4 to form the floating structure 1 together with the first portion 4. The first portion 4 may be, for example, a column section located at the waterline in an upright posture during installation and have a substantially cylindrical shape. The first portion 4 is connectable to an anchor (not shown) via a mooring line 8, allowing the floating structure 1 to be moored into a predetermined position in the sea. Further, the first portion 4 may contain a ballast tank 5 that can receive and discharge ballast water. By supplying or discharging ballast water to/from the ballast tank 5 using a ballast pump (not shown), the buoyancy can be adjusted so as to control the posture and draft.

The second portion 6 may be, for example, a wind turbine body. The second portion 6 includes a tower section 10 that can be erected on the first portion 4, a nacelle 12 pivotably mounted to the tower section 10, and a rotor 14 rotatably mounted to the nacelle 12. The rotor 14 includes at least one blade 16 and a hub 18. As the rotor 14 is rotated by wind energy, the rotational energy of the rotor 14 is input to a generator (not shown) disposed in the nacelle 12 to generate power. The power generated by the wind turbine body is transmitted via a predetermined grid.

Figure 2:
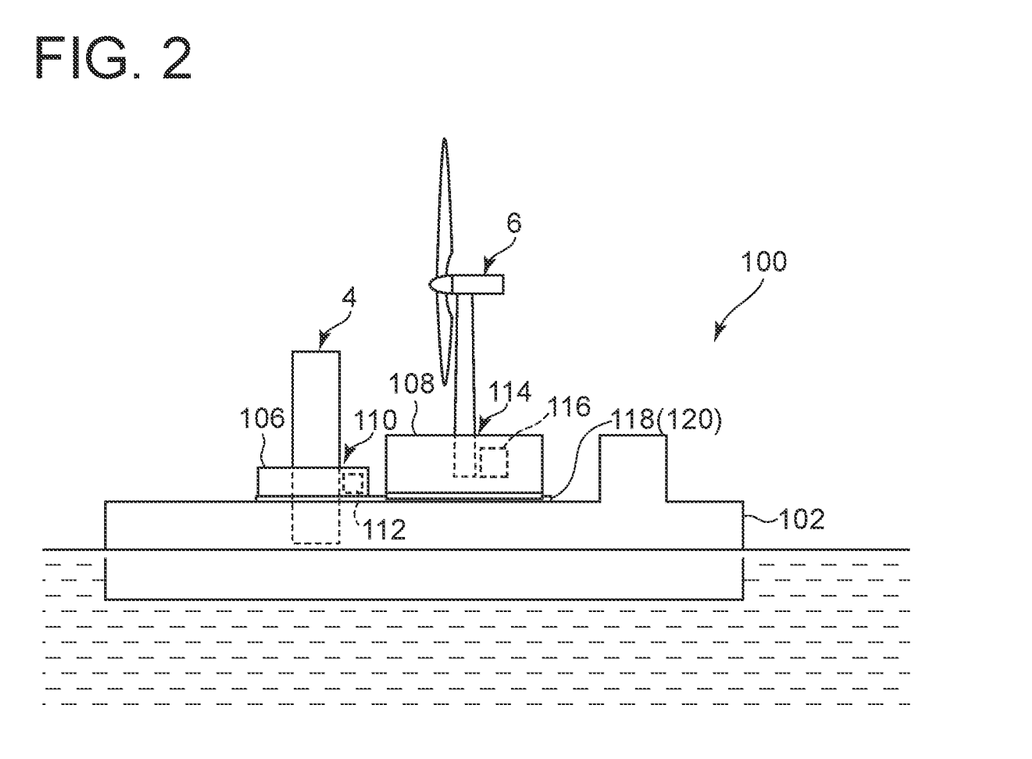
FIG. 2 is an enlarged side view of the floating structure installation system of FIG. 1.
Figure 3:
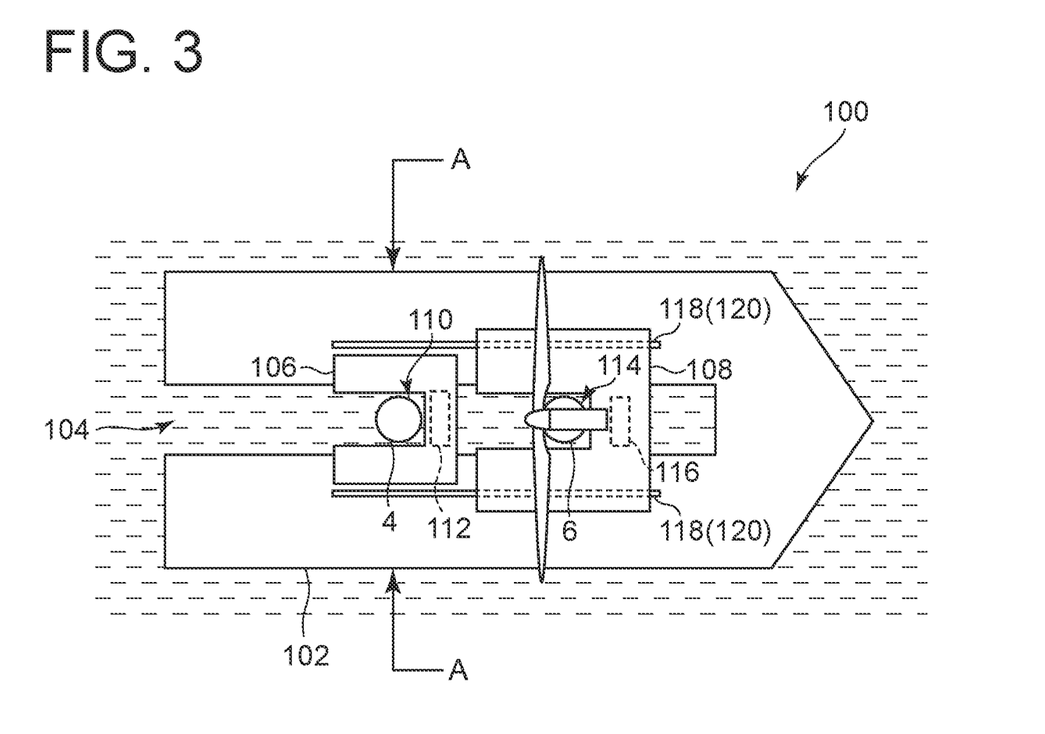
FIG. 3 is a top plan view of the floating structure installation system of FIG. 2.
Figure 4:
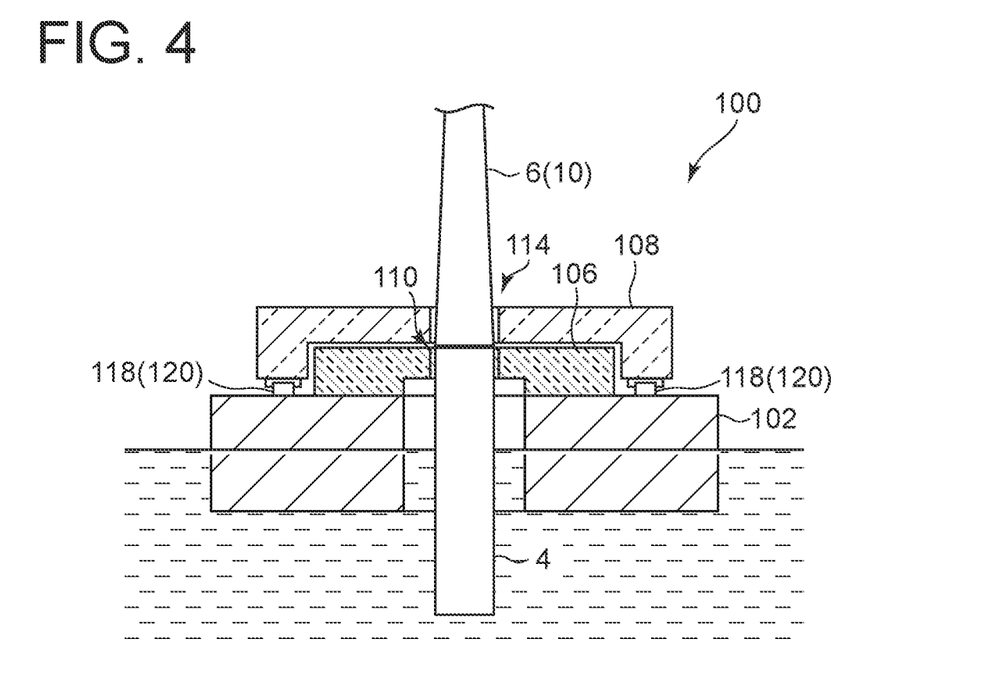
FIG. 4 is a cross-sectional view taken along line A-A in FIG. 3 when a second cradle is moved to the same position as a first cradle.

FIG. 2 is an enlarged side view of the floating structure installation system 100 of FIG. 1. FIG. 3 is a top plan view of the floating structure installation system 100 of FIG. 2. FIG. 4 is a cross-sectional view taken along line A-A in FIG. 3 when a second cradle 108 is moved to the same position as a first cradle 106. In FIGS. 2 to 4, for easy understanding of the structure, the first portion 4 and the second portion 6 of the floating structure 1 are loaded on the floating structure installation system 100 while they are separated from each other.

The floating structure installation system 100 may be configured as a vessel (dedicated installation barge) for installing the floating structure 1, for example. A body 102, which is the base of the floating structure installation system 100, has a space necessary for installing the floating structure 1, and is configured to be movable on the sea. The body 102 has a substantially horizontal and flat surface, and has an opening 104 formed by cutting out the surface so as to communicate with at least the surrounding water. Although the opening 104 is disposed on a side opposite to the traveling direction (rightward in FIG. 3) of the body 102 as shown in FIG. 3, the opening 104 may be disposed on another side.

On the body 102, a first cradle 106 and a second cradle 108 are disposed. The first cradle 106 includes a first holding part 110 for holding the first portion 4 of the floating structure 1. The first holding part 110 holds the first portion 4 in an upright posture so as to partially surround the first portion 4 from the side. Since a side of the first holding part 110 facing the opening 104 opens, introduction of the first portion 4 from the outside to the first holding part 110 and detachment of the first portion 4 from the first holding part 110 to the outside can be performed by horizontal movement without lifting and lowering.

Herein, a specific configuration of the first holding part 110 is not described in detail, but any configuration capable of holding the first portion 4 can be adopted.

The first holding part 110 includes a first lifting device 112, which enables the first portion 4 held by the first holding part 110 to be lifted and lowered. The first lifting device 112 is, for example, a jack. This device enables the adjustment of the vertical position of the first portion 4 held by the first holding part 110, especially, the position of the first portion 4 relative to the waterline. The lifting and lowering of the first portion 4 by the first lifting device 112 may be performed in conjunction with supplying and discharging of ballast water to/from the ballast tank 5 of the first portion 4.

The second cradle 108 includes a second holding part 114 for holding the second portion 6 of the floating structure 1. The second holding part 114 holds the second portion 6 (more specifically, a lower portion of the tower section 10) in an upright posture so as to partially surround the second portion 6 from the side. Since a side of the second holding part 114 facing the opening 104 opens, introduction of the second portion 6 from the outside to the second holding part 114 and detachment of the second portion 6 from the second holding part 114 to the outside can be performed by horizontal movement without lifting and lowering.

The second holding part 114 may include a second lifting device 116, which enables the second portion 6 held by the second holding part 114 to be lifted and lowered. The second lifting device 116 is, for example, a jack. In this case, since the vertical position of the second portion 6 held by the second holding part 114 can be adjusted, as described later, it is possible to facilitate connection with the first portion 4 held by the first holding part 110.

Herein, a specific configuration of the second holding part 114 is not described in detail, but any configuration capable of holding the second portion 6 can be adopted.

The body 102 has a moving device 118 thereon for moving at least one of the first cradle 106 or the second cradle 108 on the body 102. In this embodiment, the first cradle 106 is fixed to the body 102, and only the second cradle 108 is movable on the body 102. Alternatively, the second cradle 108 may be fixed to the body 102 while only the first cradle 106 is movable on the body 102, or both the first cradle 106 and the second cradle 108 may be movable on the body 102.

As shown in FIGS. 3 and 4, the moving device 118 includes a pair of rails 120 disposed along the opening 104 on both sides of the opening 104 of the body 102. At least one of the first cradle 106 or the second cradle 108 is movable along the pair of rails 120 using power from a power source (not shown). As shown in FIG. 4, when viewed in the moving direction of the moving device 118, the first cradle 106 and the second cradle 108 are shaped so as not to interfere with each other (i.e., they are shaped complementarily). In particular, when the second cradle 108 is moved to the same position as the first cradle 106, the second cradle 108 covers the first cradle 106 from above so that the first cradle 106 is placed inside the second cradle 108. Accordingly, when the first cradle 106 and the second cradle 108 are moved to the same position by the moving device 118, an upper portion of the first portion 4 loaded on the first cradle 106 and a lower portion of the second portion 6 loaded on the second cradle 108 are opposed and thus can be connected.

(Floating Structure Installation Method)

Figure 5:
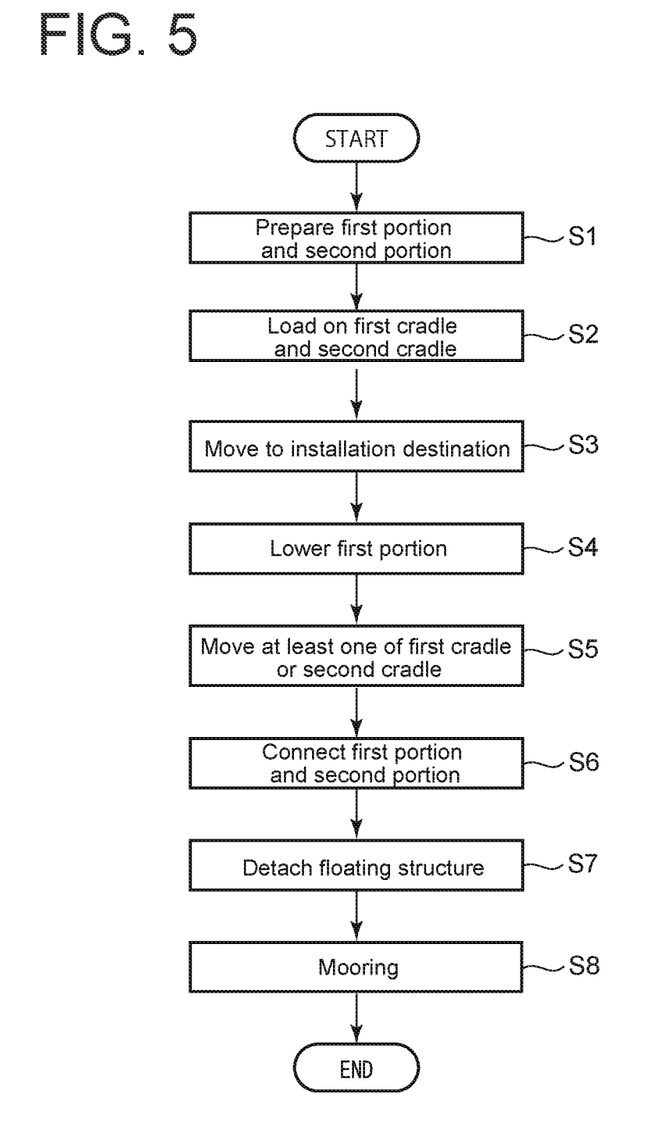
FIG. 5 is a flowchart showing steps of a floating structure installation method according to at least one embodiment of the present invention.

The floating structure installation method for installing the floating structure 1 using the floating structure installation system 100 having the above configuration will now be described. FIG. 5 is a flowchart showing steps of the floating structure installation method according to at least one embodiment of the present invention. FIGS. 6A to 6E are diagrams of the steps corresponding to FIG. 5.

First, at a wharf 123 from which the installation destination is accessible via a predetermined sea route, the first portion 4 and the second portion 6 of the floating structure 1 are prepared in a separate state (step S1). In other words, as described later, the first portion 4 and the second portion 6 are prepared in a state where the floating structure 1 can be completed only by connection operation on the sea. For instance, the first portion 4 is prepared in a state where the tower section 10, the nacelle 12, and the rotor 14 are assembled.

Figure 6A:
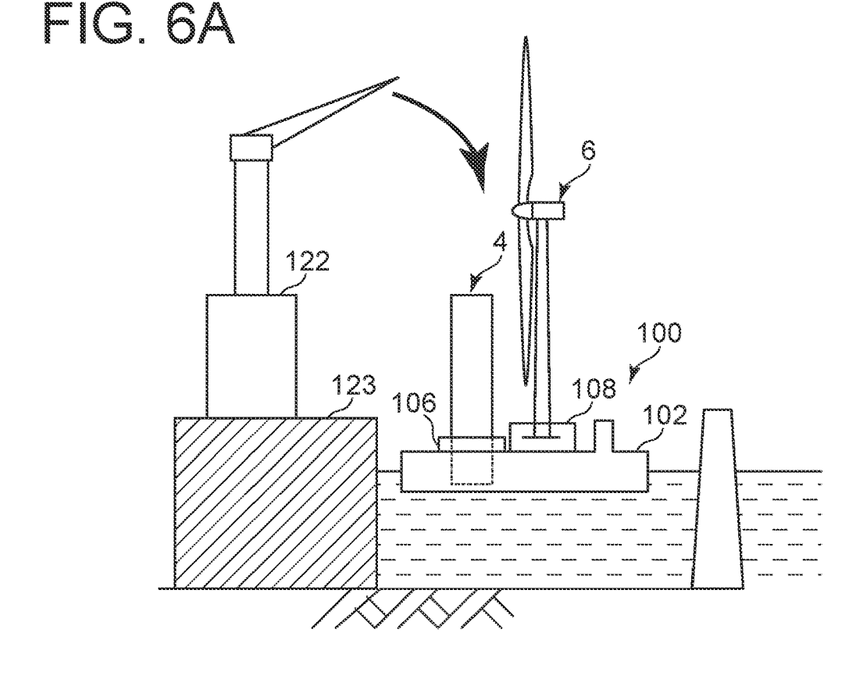
FIG. 6A is a diagram of the step corresponding to FIG. 5.

Then, as shown in FIG. 6A, the body 102 is brought alongside the wharf 123, and the first portion 4 and the second portion 6 are loaded on the first cradle 106 and the second cradle 108 on the body 102, respectively (step S2). Such loading operation of the first portion 4 and the second portion 6 from the ground may be performed by a crane device 122 disposed at the wharf 123.

At this time, on the first cradle 106, a lower portion of the first portion 4 is held by the first holding part 110 in an upright posture. Although the first portion 4 includes the submersible section 2 to be located under the water surface during installation, since the first holding part 110 holds the lower portion of the first portion 4 during loading onto the first cradle 106, the submerged region is smaller than during installation. This allows movement with the large first portion 4 being loaded even if the water depth is shallow in the vicinity of the wharf 123 (or even if the water depth restriction is severe). Further, since the first portion 4 receives less water resistance from the surrounding during traveling, it is possible to save energy required for traveling.

On the second cradle 108, a lower portion of the second portion 6 is held by the second holding part 114 in an upright posture.

Figure 6B:
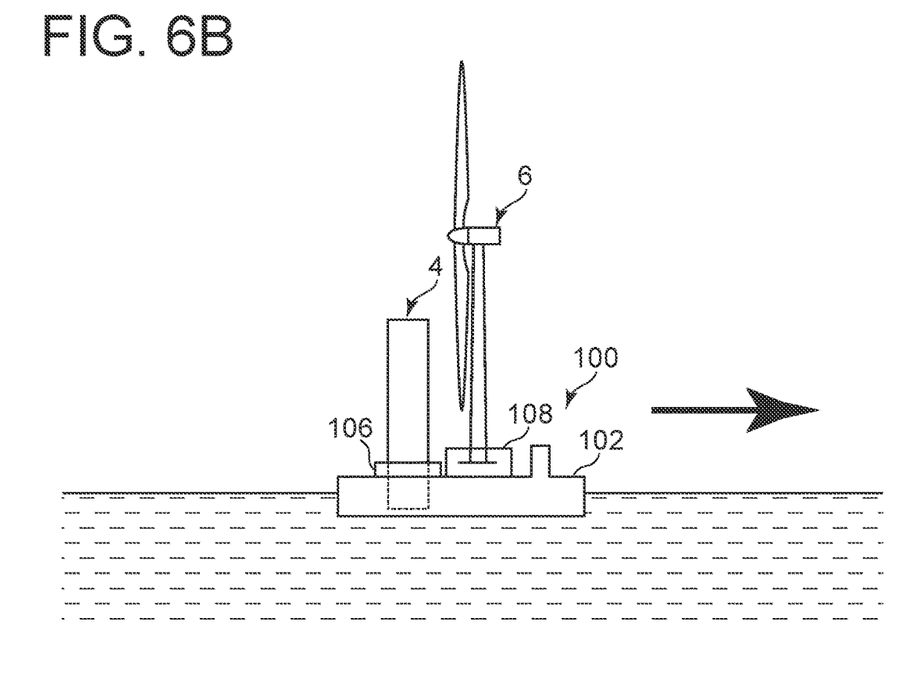
FIG. 6B is a diagram of the step corresponding to FIG. 5.

Once the first portion 4 and the second portion 6 are respectively loaded on the first cradle 106 and the second cradle 108 on the body 102, as shown in FIG. 6B, the body 102 moves to the installation destination (step S3). Also at this time, as described above, since the first holding part 110 holds the lower portion of the first portion 4, the body can travel even in an area with shallow water depth (or area with strict water depth restrictions). Further, since the water resistance from the surrounding during traveling is reduced, it is possible to save energy required for traveling.

The body 102 may travel to the installation destination by itself if the body 102 has a propulsion mechanism, or may be towed by another vessel if the body 102 has no propulsion mechanism.

Figure 6C:
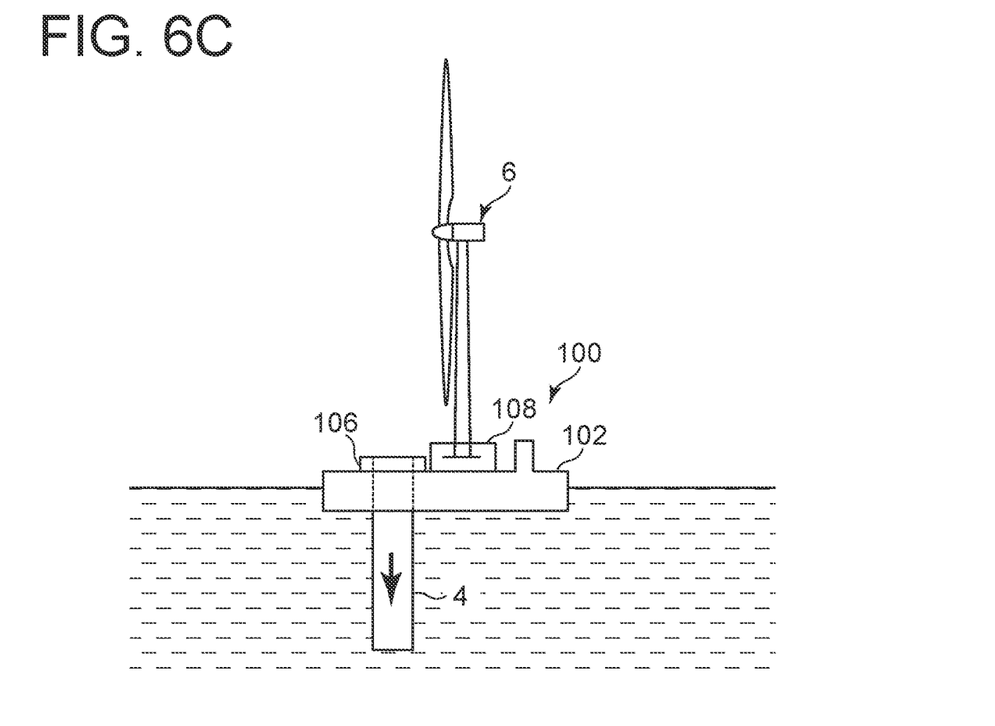
FIG. 6C is a diagram of the step corresponding to FIG. 5.

Once the movement to the installation destination is completed, as shown in FIG. 6C, the first portion 4 held by the first holding part 110 is lowered (step S4). The lowering of the first portion 4 may be performed by supplying ballast water into the ballast tank 5 built in the first portion 4 while driving the first lifting device 112 (see FIGS. 2 and 3). The waterline of the lowered first portion 4 may be the same as that during installation, or may be at a height suitable for the connection operation with the second portion 6 described below. The lowered first portion 4 is maintained in a state where an upper portion thereof is held by the first holding part 110.

Figure 6D:
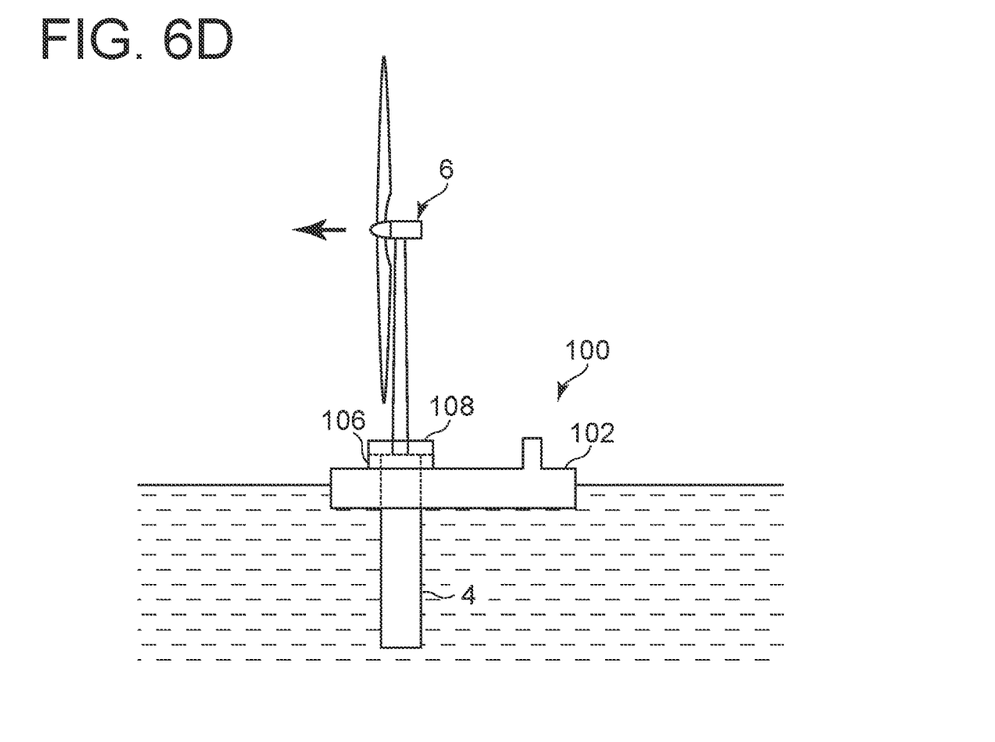
FIG. 6D is a diagram of the step corresponding to FIG. 5.

Then, as shown in FIG. 6D, at least one of the first cradle 106 or the second cradle 108 is moved (step S5), and the first portion 4 loaded on the first cradle 106 and the second portion 6 loaded on the second cradle 108 are connected (step S6). In this embodiment, since the first cradle 106 is fixed to the body 102, the second cradle 108 is moved toward the first cradle 106. When the first cradle 106 and the second cradle 108 are brought into the same position as shown in FIG. 4, the second cradle 108 covers the first cradle 106 from above, and an upper portion of the first portion 4 loaded on the first cradle 106 and an lower portion of the second portion 6 loaded on the second cradle 108 are opposed each other so as to be connectable with each other.

The connection operation in step S6 may be smoothly performed by finely adjusting a positional relationship between the first portion 4 and the second portion 6 using at least one of the first lifting device 112 or the second lifting device 116.

Figure 6E:
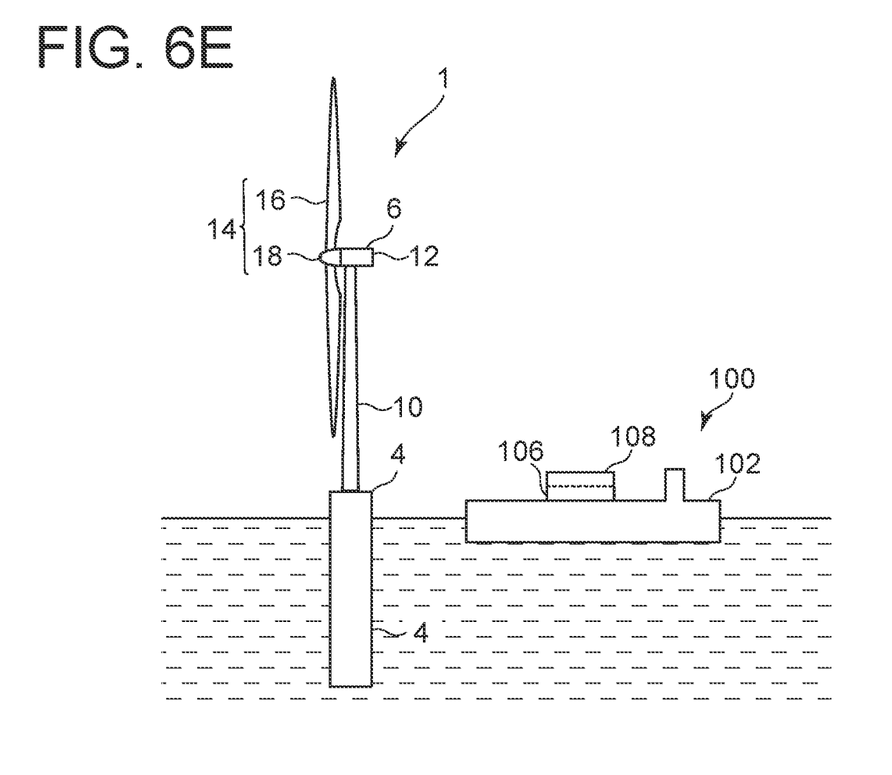
FIG. 6E is a diagram of the step corresponding to FIG. 5.

After the floating structure 1 is completed on the body 102 by the connection operation in step S6, as shown in FIG. 6E, the first holding part 110 and the second holding part 114 release the floating structure 1, so that the floating structure 1 is detached from the body 102 (step S7). As shown in FIG. 3, since the first holding part 110 and the second holding part 114 open in the same direction as the opening 104 of the body 102, the floating structure 1 released by the first holding part 110 and the second holding part 114 can be easily detached to the outside via the opening 104.

The detached floating structure 1 may be connected to an anchor via the mooring line 8 as shown in FIG. 1 and thereby moored into a predetermined position in the sea (step S8). A series of installation operations is thus completed (END).

Figure 7:
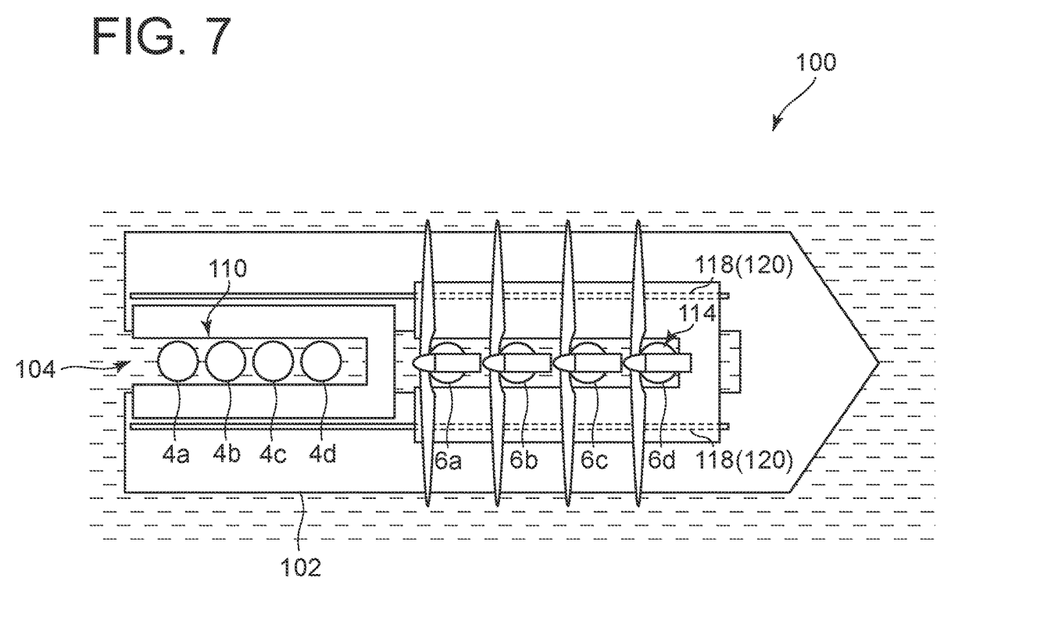
FIG. 7 is a top plan view of the floating structure installation system loaded with a plurality of floating structures.

Although, in the above description, a single floating structure 1 is installed using the floating structure installation system 100, a plurality of floating structures may be installed. FIG. 7 is a top plan view of the floating structure installation system 100 loaded with a plurality of floating structures 1.

In this embodiment, the plurality of floating structures 1 to be installed includes combinations of first portions 4a, 4b, 4c, . . . and second portions 6a, 6b, 6c, . . . in one-to-one correspondence.

The first cradle 106 has a first holding part 110 capable of simultaneously holding the plurality of first portions 4a, 4b, 4c, . . . by partially surrounding the plurality of first portions 4a, 4b, 4c, . . . . As with the above-described embodiments, the first holding part 110 opens at a side facing the opening 104 of the body 102, and has a size that can accommodate the plurality of first portions 4a, 4b, 4c, . . . , so that, sequentially, the first portions 4a, 4b, 4c, . . . can be simultaneously held therein.

Further, on the first cradle 106, the first portions 4a, 4b, 4c, . . . held by the first holding part 110 can be lifted and lowered by the first lifting device 112. The first lifting device 112 may be able to simultaneously lift and lower the plurality of first portions 4a, 4b, 4c, . . . or may be able to individually lift and lower the plurality of first portions 4a, 4b, 4c, . . . .

The second cradle 108 has a second holding part 114 capable of simultaneously holding the plurality of second portions 6a, 6b, 6c, . . . , by partially surrounding the plurality of second portions 6a, 6b, 6c, . . . . As with the above-described embodiments, the second holding part 114 opens as a side facing the opening 104 of the body 102, and has a size that can accommodate the plurality of second portions 6a, 6b, 6c, . . . , so that, sequentially, the second portions 6a, 6b, 6c, . . . can be simultaneously held therein.

Further, on the second cradle 108, the second portions 6a, 6b, 6c, . . . held by the second holding part 114 may be able to be lifted and lowered by the second lifting device 116. The second lifting device 116 may be able to simultaneously lift and lower the plurality of second portions 6a, 6b, 6c, . . . or may be able to individually lift and lower the plurality of second portions 6a, 6b, 6c, . . . .

Thus, in the floating structure installation system 100 to install the plurality of floating structures 1, as with the above-described embodiments, the body moves to the installation destinations while the first portions 4a, 4b, 4c, . . . are loaded on the first cradle 106, and the second portions 6a, 6b, 6c, . . . are loaded on the second cradle 108. Then, by moving at least one of the first cradle 106 or the second cradle 108 on the body 102, the first portions 4a, 4b, 4c, . . . and the second portions 6a, 6b, 6c, . . . are connected respectively to complete the plurality of floating structures 1.

The connection operations of the first portions 4a, 4b, 4c, . . . and the second portions 6a, 6b, 6c, . . . on the body 102 for forming all floating structures 1 may be performed simultaneously. In this case, the completed floating structures 1 are sequentially detached from the first cradle 106 and the second cradle 108 while moving to respective installation destinations to install each floating structure 1.

Alternatively, the connection operations of the first portions 4a, 4b, 4c, . . . and the second portions 6a, 6b, 6c, . . . may be individually performed for each floating structure 1. In this case, at each installation destination of the floating structure 1, a series of work including the movement of the body 102, the connection operation of the corresponding floating structure 1, and the detachment of the completed floating structure 1 is repeatedly performed.

The plurality of floating structures 1 to be installed may have the same shape, or may have different shapes as long as the above-described installation method can be applied.

In addition, the components in the above-described embodiments may be appropriately replaced with known components without departing from the spirit of the present disclosure, or the above-described embodiments may be appropriately combined.

The contents described in the above embodiments would be understood as follows, for instance.

(1) To solve the above problems, a floating structure installation system (e.g., floating structure installation system 100 in the above embodiments) according to an aspect of the present disclosure for installing a floating structure (e.g., floating structure 1 in the above embodiments) including a first portion (e.g., first portion 4, 4a, 4b, 4c, . . . in the above embodiments) having a submersible section to be located under a water surface during installation and a second portion (e.g., second portion 6, 6a, 6b, 6c, . . . in the above embodiments) connectable to the first portion comprises: a body (e.g., body 102 in the above embodiments) capable of traveling on water; a first cradle (e.g., first cradle 106 in the above embodiments) including a first holding part (e.g., first holding part 110 in the above embodiments) capable of holding the first portion on the body; a second cradle (e.g., second cradle 108 in the above embodiments) including a second holding part (e.g., second holding part 114 in the above embodiments) capable of holding the second portion on the body; and a moving device (e.g., moving device 118 in the above embodiments) configured to move at least one of the first cradle or the second cradle on the body to connect the first portion held by the first holding part and the second portion held by the second holding part. The first holding part includes a first lifting unit (e.g., first lifting device 112 in the above embodiments) for lifting and lowering the first portion.

According to the above aspect (1), the first portion and the second portion of the floating structure can be held by the first holding part of the first cradle and the second holding part of the second cradle respectively and moved, in a state where the first portion and the second portion are separated from each other. Then, at the installation destination, by moving at least one of the first cradle or the second cradle, the first portion and the second portion can be connected with each other on the body. Thus, it is possible to complete the floating structure in any position without mounting a machine such as a large crane on the body.

Further, since the first portion held by the first holding part can be lifted and lowered by the first lifting unit, the first portion can be lifted while the body is moving on the water. This enables traveling in an area with strict water depth restrictions while reducing resistance applied to the submersible section during traveling.

(2) In another aspect, in the above (1), when viewed in the moving direction of the moving device, the first cradle and the second cradle are shaped complementarily (for instance, the first cradle 106 and the second cradle 108 do not interfere with each other as shown in FIG. 4 according to the above embodiment).

According to the above aspect (2), when at least one of the first cradle or the second cradle is moved to connect the first portion and the second portion, the first cradle and the second cradle do not interfere with each other. Thus, the floating structure can be completed by appropriately combining the first portion held by the first holding part of the first cradle and the second portion held by the second holding part of the second cradle.

(3) In another aspect, in the above (1) or (2), the body has an opening (e.g., opening 104 in the above embodiments) formed so as to extend from a position at which the first portion and the second portion are connected to an outside of the body.

According to the above aspect (3), the floating structure completed on the body by connecting the first portion and the second portion can be detached to the outside via the opening.

(4) In an aspect, in the above (3), the moving device includes a pair of rails (e.g., pair of rails 120 in the above embodiments) disposed along the opening on both sides of the opening.

According to the above aspect (4), by moving at least one of the first cradle or the second cradle using the pair of rails disposed on both sides of the opening, the connection operation between the first portion and the second portion and the detachment of the completed floating structure can be efficiently performed.

(5) In an aspect, in any of the above (1) to (4), the first portion has a hollow structure (e.g., ballast tank 5 in the above embodiments) capable of receiving and discharging ballast water.

According to the above aspect (5), the first portion that can be lifted and lowered by the first lifting unit has a hollow structure. When the first portion is lifted, by making the hollow structure empty without ballast water therein, it is possible to reduce the weight of the first portion. When the first portion is lowered, by supplying ballast water to the hollow structure, it is possible to submerge the submersible section of the first portion. Thus, it is possible to facilitate the operation through supplying and discharging of ballast water to/from the hollow structure.

(6) In an aspect, in any of the above (1) to (5), the second holding part includes a second lifting unit (e.g., second lifting device 116 in the above embodiments) for lifting and lowering the second portion held by the second holding part.

According to the above aspect (6), the second portion held by the second holding part can be lifted and lowered by the second lifting unit. This facilitates the alignment of the first portion and second portion to be connected and improves the working efficiency.

(7) To solve the above problems, a floating structure installation method according to an aspect of the present disclosure for installing a floating structure (e.g., floating structure 1 in the above embodiments) including a first portion (e.g., first portion 4, 4a, 4b, 4c, . . . in the above embodiments) having a submersible section to be located under a water surface during installation and a second portion (e.g., second portion 6, 6a, 6b, 6c, . . . in the above embodiments) connectable to the first portion comprises: a loading step (e.g., step S2 of FIG. 5 in the above embodiments) of loading the first portion and the second portion on a first cradle (e.g., first cradle 106 in the above embodiments) and a second cradle (e.g., second cradle 108 in the above embodiments), respectively, on a body (e.g., body 102 in the above embodiments) capable of traveling on water; a moving step (e.g., step S3 of FIG. 5 in the above embodiments) of moving the body to a destination while the first portion and the second portion are loaded on the first cradle and the second cradle respectively; a connecting step (e.g., step S5 and S6 of FIG. 5 in the above embodiments) of, at the destination, connecting the first portion and the second portion by moving at least one of the first cradle or the second cradle on the body to complete the floating structure; and a detaching step (e.g., step S7 of FIG. 5 in the above embodiments) of detaching the floating structure from the body.

According to the above aspect (7), the first portion and the second portion of the floating structure are loaded on the first cradle and the second cradle and transferred to the destination, in a state where the first portion and the second portion are separated from each other. Then, at the installation destination, by moving at least one of the first cradle or the second cradle, the first portion and the second portion are connected to complete the floating structure on the body. The completed floating structure is detached from the body, and installation to the destination is completed.

(8) In an aspect, in the above (7), the loading step includes loading the first portion on the first cradle with the submersible section being located above a water surface, and the connecting step includes lowering the first portion such that the submersible section is located under the water surface and connecting the first portion and the second portion (e.g., step S4 of FIG. 5 in the above embodiments).

According to the above aspect (8), before traveling to the destination, the first portion is loaded on the first cradle with the submersible section being located above the water surface. This enables traveling in an area with strict water depth restrictions while reducing resistance applied to the submersible section during traveling.

(9) In an aspect, in the above (8), the connecting step including supplying ballast water to an internal space of the first portion to lower the first portion (for instance, in step S4 of FIG. 5 in the above embodiments, the first portion 4 is lowered by supplying ballast water to the ballast tank 5 in the first portion 4).

According to the above aspect (9), by supplying ballast water to the interior space of the first portion, after the travel to the destination, it is possible to easily lower the first portion such that the submersible section is located under the water surface.

(10) In an aspect, in the above (8) or (9), the connecting step includes moving the second cradle relative to the first cradle fixed to the body to connect the first portion and the second portion (for instance, in step S5 of FIG. 5 in the above embodiments, the second cradle 108 is moved toward the first cradle 106).

According to the above aspect (10), the connection operation is performed by moving the second cradle holding the second portion while the first cradle holding the first portion is fixed to the body. At this time, since the first portion having the submersible section located under the water surface does not move relative to the body, it is possible to easily perform the connection operation without relative motion between the first portion and the second portion during the connection operation.

The invention claimed is:

1. A floating structure installation system for installing a floating structure including a first portion and a second portion connectable to the first portion, the floating structure installation system comprising:
    a buoyant body adapted to be driven or towed on water;
    a first cradle disposed on the body and including a first holding part configured to hold the first portion on the body;
    a second cradle disposed on the body and including a second holding part configured to hold the second portion on the body; and
    a moving device configured to move at least one of the first cradle or the second cradle on the body to connect the first portion held by the first holding part and the second portion held by the second holding part,
    wherein the first holding part includes a first lifting unit for lifting and lowering the first portion,
    wherein the first portion has a submersible section located under a waterline during installation, and
    wherein the second portion is a wind turbine body including a tower section configured to be coupled to the first portion.

2. The floating structure installation system according to claim 1,
    wherein the moving device is operable to move the second cradle relative to the first cradle, and
    wherein the second cradle is configured to cover the first cradle from above when the second cradle is moved by the moving device to the same position as the first cradle so that the first cradle is placed inside the second cradle.

3. The floating structure installation system according to claim 1,
    wherein the body has an opening formed so as to extend from a position at which the first portion is disposed on the body to an outside of the body such that the body has an open end.

4. The floating structure installation system according to claim 3,
    wherein the moving device includes a first rail disposed on a first side of the opening and a second rail disposed on a second side of the opening.

5. The floating structure installation system according to claim 1,
    wherein the first portion includes a ballast tank for receiving and discharging ballast water.

6. The floating structure installation system according to claim 1, wherein the second holding part includes a second lifting unit for lifting and lowering the second portion held by the second holding part.

7. A floating structure installation method for installing a floating structure including a first portion during installation and a second portion connectable to the first portion, the floating structure installation method comprising:
 a loading step of loading the first portion and the second portion on a first cradle and a second cradle, respectively, on a buoyant body adapted to be driven or towed on water;
 a moving step of moving the body on a water surface to a destination while the first portion and the second portion are loaded on the first cradle and the second cradle, respectively;
 a connecting step of, at the destination, connecting the first portion and the second portion by moving at least one of the first cradle or the second cradle on the body to complete the floating structure; and
 a detaching step of detaching the completed floating structure from the body,
 wherein the first portion has a submersible section located at a waterline during the connecting step, and
 wherein the second portion is a wind turbine body including a tower section that is coupled to the first portion during the connecting step.

8. The floating structure installation method according to claim 7,
 wherein the loading step includes loading the first portion on the first cradle with the submersible section being located above the surface of the water, and
 wherein the connecting step includes lowering the first portion such that the submersible section is located below the water surface and connecting the first portion and the second portion.

9. The floating structure installation method according to claim 8,
 wherein the connecting step includes supplying ballast water to an internal space of the first portion to lower the first portion below the surface of the water.

10. The floating structure installation method according to claim 8,
 wherein the connecting step includes moving the second cradle relative to the first cradle, which is fixed to the body, to connect the first portion and the second portion.

11. The floating structure installation system according to claim 1,
 wherein the body is movable to an installation destination while the first portion and the second portion are respectively loaded on the first cradle and the second cradle on the body.

12. The floating structure installation system according to claim 7,
 wherein the body is movable to an installation destination while the first portion and the second portion are respectively loaded on the first cradle and the second cradle on the body.

13. A floating structure installation system for installing a floating structure including a first portion having a submersible section to be located under a water surface during installation and a second portion connectable to the first portion, the floating structure installation system comprising:
 a buoyant body adapted to travel on water;
 a first cradle disposed on the body and including a first holding part for holding the first portion on the body;
 a second cradle disposed on the body and including a second holding part for holding the second portion on the body; and
 a moving device configured to move at least one of the first cradle or the second cradle on the body to connect the first portion held by the first holding part and the second portion held by the second holding part,
 wherein the first holding part includes a first lifting unit for lifting and lowering the first portion, and
 wherein the second cradle is configured to cover the first cradle from above when the second cradle is moved to the same position as the first cradle so that the first cradle is placed inside the second cradle.

* * * * *